Oct. 5, 1926.
H. WYDLER
1,601,899
APPARATUS FOR MEASURING LIQUIDS DRAWN BY SUCTION FROM LOW LEVEL SUPPLY TANKS
Filed Oct. 4, 1924
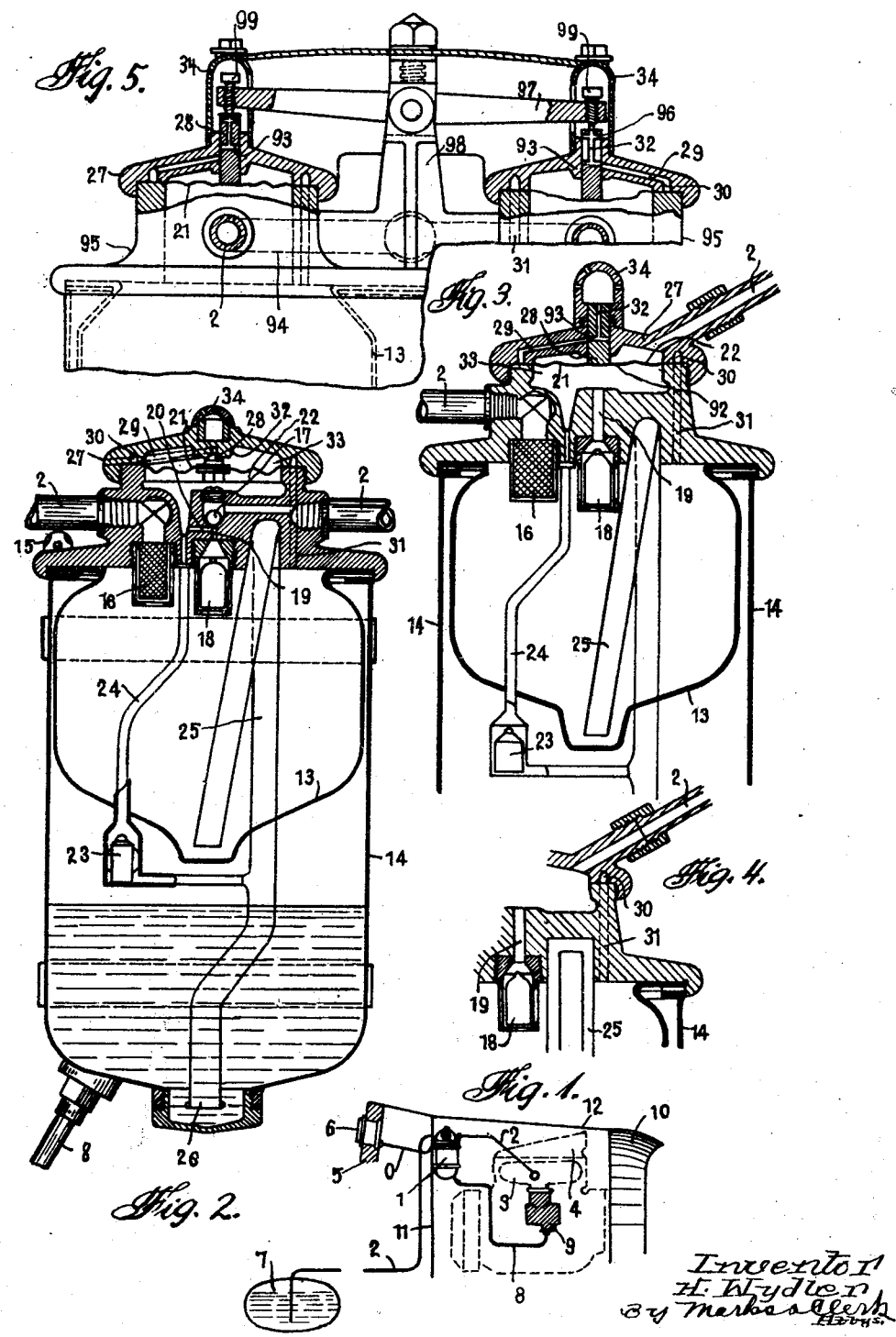

Patented Oct. 5, 1926.

1,601,899

UNITED STATES PATENT OFFICE.

HERMANN WYDLER, OF BERN, SWITZERLAND, ASSIGNOR TO THE FIRM: SAUSER A. G., OF SOLEURE, SWITZERLAND.

APPARATUS FOR MEASURING LIQUIDS DRAWN BY SUCTION FROM LOW-LEVEL SUPPLY TANKS.

Application filed October 4, 1924, Serial No. 741,679, and in Switzerland October 5, 1923.

The present invention refers to an apparatus for measuring liquids drawn by suction from low-level supply tanks.

In the annexed drawing several forms of an apparatus for benzene are shown as examples, to wit, in:

Fig. 1 a diagrammatical view of the general arrangement of an apparatus mounted within the fuel supply pipe of the motor car.

Fig. 2 a vertical central section of a first form of the apparatus.

Figs. 3 and 4 are partial corresponding sections of two other forms of the apparatus, Fig. 5 is a combination of two apparatus with a view of having a continuous supply of liquid.

Similar letters of reference refer to similar parts throughout the several views.

Only that part of the suction conduit of the pump is shown into which the apparatus has been inserted.

According to Fig. 1 an apparatus 1 of the first working form is mounted within the suction conduit 2 between the manifold 3 of a motor 4 and a main fuel tank 7. A feed pipe 8 connects the apparatus with the carburettor 9, and 10 represents a radiator. 11 and 12 are walls of the carriage body and 6 is an indicator attached to the dash board 5 for indicating the level in the main tank.

As shown in Fig. 2 a gauged vessel 13 is mounted within the upper part of more than twice as large a delivery vessel 14, which by means of an air inlet cap 15 is kept under constant atmospheric pressure and is connected through a discharge pipe 8 with the carburettor. A suction conduit 2 provided with a strainer 16 and leading to the main supply tank communicates with the said gauged vessel, which is also joined by a suction conduit 2 branched from the manifold of the car motor. Communication is established between this latter conduit 2 and the top of the gauged vessel 13 by means of a vertical passage 19 which is controlled at its inlet by a ball non-return valve 17 and at the outlet by a float-valve 18 and has a branch canal 20 leading into a chamber 22, shut off by a diaphragm 21. This chamber has a relatively narrow pipe connection 24 with a bent siphon pipe 25 intended for the overflow from the gauged vessel into the delivery vessel 14, the passage through said pipe connection 24 being controlled by a float valve 23 and the bend of the siphon pipe being arranged at a higher level than the float-valve 18, float-valve 23 however being provided at a level which would be taken within the delivery vessel 14 by the discharged content of the gauged vessel. The outlet of the delivery leg of the siphon pipe is normally shut off by a self shutting flap valve 26, operated for instance by a torsional spring not shown. The diaphragm 21 shuts off the inside of the uppermost cover 27 of the apparatus and carries at its center an adjustable needle valve 28, the valve-box of which communicates through a passage 29 with an annular canal 30 in the border of said cover 27. This annular canal has an outlet passage way 31 into the gauged vessel 13 while an opening 32 is leading from the air inlet cap 34 to the hollow 33 between diaphragm 21 and cover 27.

The working of this first form of a measuring apparatus is as follows:

The apparatus is supposed to be empty and the suction in pipe 2 to be constantly efficient owing to the running of the motor 4.

The first effect will be to lift the ball valve 17 thus creating a vacuum within the gauged vessel 13, within the siphon pipe 25 and within the suction pipe 2 leading to the main tank, but also through canal 20 within chamber 22. The vacuum in this latter chamber however is not sufficient to bend the diaphragm 21 but will keep the flap valve 26 closed and will cause the filling of the gauged vessel from tank 7. At the very moment when the rising liquid lifts the float 18 sufficiently, canal 19 will be closed and the vacuum within the gauged vessel and pipe 2 leading to the tank be interrupted, but will continue with increasing efficiency through canal 20 within chamber 22 and in the delivery leg of the siphon pipe through canal 24.

But this will not yet cause the liquid of the gauged vessel to be sucked over into the delivery vessel because the atmospheric pressure has not yet been established above the liquid within the gauged vessel, as it exists within the delivery vessel. Besides the passage within the bend of siphon pipe 25 is at a higher level than the liquid of the gauged vessel. However the sucking-over of the liquid will occur and this at once, when by the effect of the increasing vacuum within chamber 22 the diaphragm will have bulged and have opened the air-valve 28 and have established the communication between the outside atmospheric pressure and the measuring vessel through passages 29, 30 and 31. The liquid will be rapidly sucked into the delivery vessel. The accurate measuring within vessel 13 is thus made quite independent from any untight valves or the weight of bulky floats or air bubbles within the suction pipe, because all air may escape into the gauged vessel. When this vessel has become empty, float 18 will still remain clinging to the outlet of canal 19 until the maximum level within the delivery vessel will have lifted float 23, thus interrupting canal 24.

The suction within the siphon pipe 25 will then cease and the conditions within the apparatus will remain as they are, floats 18, 23 remaining in their blocking position and valve 28 remaining open until the level within the delivery vessel 14 has subsided by any occasional draw-off of liquid effected through the feed pipe 8 of the carburettor, which may be controlled by a check valve or the like.

Now owing to the fact that the liquid carrying the float 23 has run back into the delivery vessel and that the sucking effect in the long and relatively narrow pipe is too weak to retain said float, this latter will be dropped and open the canal 24 and admit the atmospheric pressure to chamber 22 through siphon pipe 25 so that the diaphragm 21 will spring back into its normal position closing again the valve 28 which will cause the float 18 to drop, thus freeing again canal 19. The initial position of parts is thus reestablished and a new measuring process may begin. The flap valve 26 acts during the whole process simply as an air shut-off valve of the gauged vessel allowing a vacuum to be created therein against the atmospheric pressure within the delivery vessel.

Owing to the fact that this flap valve is under the effect of a light torsional spring the delivery into vessel 14 will in no way be hindered.

The working forms of the apparatus shown in Figs. 3 and 4 has the same arrangement of the suction conduit leading to the motor and to the tank, of the float 18 and the annular canal 30, the canals 29 and 31 and the diagram 21.

In Fig. 4 the siphon device 25 has the shape of two straight pipes sleeved one over the other which arrangement is exactly of the same effect as the one shown in Fig. 3.

But in this Fig. 3 the canal 19 controlled by the float 18 opens directly into the chamber 33 underneath the diaphragm and the suction conduit 2 from the manifold of the motor communicates directly with the chamber 22 above said diaphragm. This diaphragm 21 is provided with a restricted hole 92 and instead of a needle valve carries a piston 28 fixed thereto and presenting at the level of canal 29 an annular canal 93 which communicates through an axial canal 32 with the air inlet cap 34.

The working of this form is as follows:

When the vacuum from the motor is established within chamber 22 through the conduit 2, which chamber communicates with chamber 33 only through a restricted hole 92, the diaphragm 21 bulges at once upwards and pushes piston 28 likewise upwards so as to cut off the communication between canals 29 and 93 and thereby the communication between the atmosphere and the gauged vessel through the canals 29, 30, and 32. Therefore the vacuum will be extended through chamber 33 and canal 19 into the gauged vessel and the fuel supply through the suction conduit 2 will be started and the vessel 13 be filled inasmuch as the flap valve 26 at the orifice of the discharge leg of the siphon 25 is closed (Fig. 2) and the vessel is only communicating wtih the tank 7.

When the rising level of the liquid has lifted the float 18 and closed canal 19 the fuel supply from the tank is cut-off and the vacuum in chamber 22 is increased, but will be also increased in chamber 33 until the two vacuums are nearly compensated, whereupon the diaphragm will spring back again into its normal position. The communication between canals 93 and 29 being then restored the ventilating of the gauged vessel will be effected and the liquid in this vessel being on the same level within the vessel and within the suction leg of the siphon will at once be sucked over into the vessel 14 owing to the sucking effect transmitted through pipe 24.

Also when the level of the liquid in the vessel 14 has lifted float 23 so as to shut off the pipe 24 the pressure remains about the same, so that the diaphragm 21 remains in its normal position where the valve-piston 28 admits the air. Also the float 18 remains clinging to its seat, during the whole discharge of the gauged vessel and as long as valve 23 remains closed under the effect of the atmospheric pressure within the gauged vessel and the vacuum in the chambers 33 and 22. But as soon as the level in the delivery vessel sinks, float 23 will drop and the sucking effect will be transmitted to the gauged vessel through pipes 24 and 25 and as the said vessel is under atmospheric pressure no air can be sucked in by said way. This causes a difference of pressure in the two chambers 22 and 23, which will cause diaphragm 21 to bulge and the access of the atmospheric air to be interrupted. The vacuum introduced within the gauged vessel through canals 24 and 25 will suck up the air contained therein, which causes float 18 to drop and reestablishes the initial position of parts again.

In Fig. 5 two apparatus according in certain parts with the form of Fig. 2 and in others with that of Fig. 3 are combined so that one apparatus is filling while the other is discharging in order to obtain a continuous discharge.

The two gauged vessels 13 are mounted on one common delivery vessel 14 and are connected to the same suction conduit 2 from the pump or the like. This conduit is connected to the cover 95 of the apparatus in the manner of Fig. 2 by two branchings 94. But each apparatus possesses its own suction from the tank not shown. The ventilation device is arranged as in Fig. 3, pistons 28 are fixed to the diaphragms 21, which have no restricted hole as in Fig. 3. The pistons 28 are guided within the hubs of the covers 27 and are provided with an axial canal 32 which communicates with upper lateral openings 96 and with inferior lateral openings 93. In the normal position of the diaphragms the openings 93 are cut-off from the canals 29 which ought to effect the ventilation of the vessel through the canals 29, 30, 31, but in the bulged condition of the diaphragms that is in the lowered position of the pistons said openings 93 register with the canals 29. The openings 96 however always open into the space surrounded by the air-inlet cap 34 wherefore in the bulged position of the diaphragms the gauged vessel will be ventilated and the discharge of the liquid rendered possible.

On a standard 98 fixed to the cover 95 between the two small covers 27 there is a two armed lever 97 pivotally mounted and provided with adjustable pointed screws or snifting valves of the two apparatus in such a way that the rising of one piston, that is the aspiration of the liquid into the respective vessel, is only possible when the other piston has sunk, that is when in the respective vessel the ventilation and the discharge of the liquid takes place. But, as has been shown in the above, this discharge can only go on when the level in the common delivery vessel has already sunk sufficiently so as to open the float valve 23. This combination of apparatus therefore will allow if needed to get a continuous discharge of the liquid fuel or at least to avoid any loss of time in awaiting the filling of a vessel.

Instead by means of a lever 97 the reciprocal dependance of the two pistons 28 of the snifting valves could also be obtained by means of a hydraulic device for instance by means of a pipe filled with oil or other suitable liquid said pipe having at both ends hydraulic cylinders wherein the prolonged pistons 28 of the valves are guided.

In all the described apparatus the arrangement of parts is thus that dismountable parts which would give access to the inner mechanism can be sealed so as to prevent any malicious tampering.

Owing to the fact that in the case of any untightness in the suction conduit no vacuum can be established therein this apparatus serves not only as a control of the content of a fuel tank by registering every amount withdrawn from the same but also as a control of the tightness of the conduit and a guarantee against losses through leakage.

Having now particularly described and ascertained the nature of my invention and in what manner the same is to be performed I declare that what I claim is:

I claim:—

1. In an apparatus for measuring liquids drawn by suction from a low-level supply tank the combination with a suction producing device, a suction conduit joined to the same, an intermediate gauged vessel inserted into said conduit, a delivery vessel located underneath said gauged vessel, a siphon pipe adapted to drain off the gauged vessel into said delivery vessel and means adapted to start the siphon and comprising a cut-off float valve between suction conduit and gauged vessel, a canal joining the suction conduit to the delivery leg of the siphon and a float valve controlling this canal, the latter float depending on the level of liquid in the delivery vessel and the first on that in the gauged vessel.

2. In an apparatus for measuring liquids drawn by suction from a low-level supply tank the combination with a suction producing device, a suction conduit joined to the same, an intermediate gauged vessel inserted into said conduit, a siphon pipe adapted to drain off this gauged vessel, a self-closing flap valve at the orifice of the siphon delivery leg for intercepting the communication between said gauged vessel and its outside and a cut-off float valve for controlling the passage way between the suction conduit and the gauged vessel, a diaphragm confining a suction chamber in the cover of the gauged vessel, a canal between said chamber and the suction conduit and a snifting valve integral with said diaphragm and arranged so as to admit atmospheric pressure into the gauged vessel.

3. In an apparatus for measuring liquids drawn by suction from a low-level supply tank the combination with a suction producing device, a suction conduit joined to the same, an intermediate gauged vessel inserted into said conduit, a delivery vessel located underneath said gauged vessel, a siphon pipe adapted to drain off the gauged vessel into said delivery vessel, a self-closing flap-valve at the orifice of the siphon delivery leg for intercepting the communication between the said two vessels, a cut-off float valve for controlling the passage-way between the suction conduit and the gauged vessel, a diaphragm confining a suction chamber in the cover of the gauged vessel, a canal between said chamber and the suction conduit, a snifting valve integral with said diaphragm and means adapted to start the siphon comprising a canal joining the suction chamber and the delivery leg of the siphon and a float valve controlling this canal, the latter float depending on the level of liquid in the delivery vessel and the first on that in the gauged vessel.

4. In an apparatus for measuring liquids drawn by suction from a low-level supply tank the combination with a suction producing device, a suction conduit joined to the same, an intermediate gauged vessel inserted into said conduit, a delivery vessel located underneath said gauged vessel, a siphon pipe adapted to drain off this gauged vessel, a self closing flap valve at the orifice of the siphon delivery leg for intercepting the communication between the gauged vessel and its outside and a cut-off float valve for controlling the passage-way between suction conduit and gauged vessel, a diaphragm having a restricted hole and arranged so as to separate an outward suction chamber joined directly to the suction leg of the suction device from an inward suction chamber, canals of communication between this latter chamber and the gauged vessel and between said chamber and the discharge leg of the siphon, a float valve adapted to control the last named canal and depending on the level of liquid in the delivery vessel, a snifting valve having a piston integral with said diaphragm and canals in this piston and in the cover of the gauged vessel and arranged so as to establish at times communication between the gauged vessel and the outside air.

In testimony whereof I affix my signature.

HERMANN WYDLER.